(12) United States Patent
Guo et al.

(10) Patent No.: US 11,739,970 B2
(45) Date of Patent: Aug. 29, 2023

(54) AIR-CONDITIONING DEVICE CONTROL METHOD AND AIR-CONDITIONING DEVICE

(71) Applicant: GD MIDEA AIR-CONDITIONING EQUIPMENT CO., LTD., Foshan (CN)

(72) Inventors: Jun Guo, Foshan (CN); Xiaohui Zhang, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 17/293,336

(22) PCT Filed: Jan. 29, 2019

(86) PCT No.: PCT/CN2019/073645
§ 371 (c)(1),
(2) Date: May 12, 2021

(87) PCT Pub. No.: WO2020/107698
PCT Pub. Date: Jun. 4, 2020

(65) Prior Publication Data
US 2022/0011002 A1     Jan. 13, 2022

(30) Foreign Application Priority Data
Nov. 30, 2018 (CN) .......................... 201811450527.9

(51) Int. Cl.
*F24F 11/65* (2018.01)
*F24F 11/64* (2018.01)
(Continued)

(52) U.S. Cl.
CPC .............. *F24F 11/65* (2018.01); *F24F 11/64* (2018.01); *G05B 19/042* (2013.01);
(Continued)

(58) Field of Classification Search
CPC ........ F24F 11/65; F24F 11/64; F24F 2120/20; F24F 11/30; F24F 11/58; F24F 11/57;
(Continued)

(56) References Cited

U.S. PATENT DOCUMENTS

2008/0289009 A1* 11/2008 Lee .................... H04L 63/0227
726/4
2009/0254980 A1* 10/2009 Kanaparti ............. H04L 63/107
726/4
(Continued)

FOREIGN PATENT DOCUMENTS

CN     102052736 A     5/2011
CN     103533033 A     1/2014
(Continued)

OTHER PUBLICATIONS

The European Patent Office (EPO) Extended Search Report for EP Application No. 19888290.4 dated Nov. 26, 2021 10 Pages.
(Continued)

*Primary Examiner* — Michael W Choi
(74) *Attorney, Agent, or Firm* — ANOVA LAW GROUP PLLC

(57) ABSTRACT

An air-conditioning device control method includes receiving an instruction sent by a terminal device, judging whether the instruction comes from a preset local area network, identifying a user identity according to the instruction in response to the instruction coming from the preset local area network, acquiring an operation mode of an air-conditioning device that is adapted to the user identity, and executing the operation mode of the air-conditioning device.

13 Claims, 2 Drawing Sheets

(51) Int. Cl.
  *G05B 19/042* (2006.01)
  *H04L 12/28* (2006.01)
  *F24F 120/20* (2018.01)

(52) U.S. Cl.
  CPC ........ *H04L 12/282* (2013.01); *F24F 2120/20* (2018.01); *H04L 2012/285* (2013.01)

(58) Field of Classification Search
  CPC ......... F24F 11/70; F24F 11/88; G05B 19/042; H04L 12/282; H04L 2012/285; H04L 67/306; H04L 67/125; H04L 12/2807
  See application file for complete search history.

(56) References Cited

U.S. PATENT DOCUMENTS

| | | | |
|---|---|---|---|
| 2014/0138043 A1* | 5/2014 | Matsumoto | F24F 1/0063 165/11.1 |
| 2016/0131385 A1 | 5/2016 | Poplawski et al. | |
| 2017/0085393 A1* | 3/2017 | Tobella | F24F 11/62 |
| 2018/0266718 A1* | 9/2018 | Gillette | F24F 11/64 |
| 2020/0036592 A1* | 1/2020 | Kholaif | H04L 67/306 |

FOREIGN PATENT DOCUMENTS

| | | |
|---|---|---|
| CN | 104754050 A | 7/2015 |
| CN | 104976736 A | 10/2015 |
| CN | 105020860 A | 11/2015 |
| CN | 105159121 A | 12/2015 |
| CN | 205079396 U | 3/2016 |
| CN | 105955221 A | 9/2016 |
| CN | 107172620 A | 9/2017 |
| CN | 108105948 A | 6/2018 |
| CN | 108131791 A | 6/2018 |
| CN | 108548271 A | 9/2018 |
| CN | 108650155 A | 10/2018 |
| JP | 2002147826 A | 5/2002 |

OTHER PUBLICATIONS

World Intellectual Property Organization (WIPO) International Search Report and Written Opinion for PCT/CN2019/073645 with translation dated Aug. 21, 2019 22 Pages.

The State Intellectual Property Office of PRC (SIPO) The First Office Action For CN Application No. 201811450527.9 dated Sep. 29, 2019 15 Pages (Translation Included).

The State Intellectual Property Office of PRC (SIPO) The Second Office Action For CN Application No. 201811450527.9 Mar. 9, 2020 16 Pages (Translation Included).

\* cited by examiner

AIR-CONDITIONING DEVICE CONTROL METHOD AND AIR-CONDITIONING DEVICE

CROSS-REFERENCE TO RELATED APPLICATIONS

This application is a National Stage Entry under 35 U.S.C. § 371 of International Application No. PCT/CN2019/073645, filed on Jan. 29, 2019, which claims priority to Chinese Patent Application No. 201811450527.9, filed by GD MIDEA AIR-CONDITIONING EQUIPMENT CO., LTD. on Nov. 30, 2018, and entitled "AIR-CONDITIONING DEVICE CONTROL METHOD AND AIR-CONDITIONING DEVICE," the entire contents of both of which are incorporated herein by reference.

TECHNICAL FIELD

The present disclosure relates to the field of home appliance technology, in particular relates to an air-conditioning device control method and an air-conditioning device.

BACKGROUND

In the related art, an air-conditioning device (e.g., an air machine that integrates functions of a humidifier, a purifier, and an air conditioner, and focuses on controlling indoor air humidity, temperature, and cleanliness) is applied to regulate air in home.

When enjoying services brought by an air-conditioning device, a user needs to set an operation parameter and an operation mode of the air-conditioning device according to a personal preference. Because different users have different preferences. Therefore, once user A has set an operation mode suitable for user A, when user A does not use but user B uses, user B may change the operation mode previously set by user A. As such, user A, when using again, needs to reset the operation mode. This is very inconvenient and the user experience of the air-conditioning device is poor.

SUMMARY

The present disclosure aims to solve at least one of the technical problems in the related art to a certain extend.

In view of the above, an object of the present disclosure is to provide an air-conditioning device control method. This method can push an operation mode that suits a user's own habit to the user without the user performing setting. As such, it is unnecessary for a user to reset each time, thus reducing operations; and at the same time, the air-conditioning device can provide better service to the user, thus effectively improving user experience of the air-conditioning device.

A second object of the present disclosure is to provide an air-conditioning device.

A third object of the present disclosure is to provide a non-transitory computer readable storage medium.

A fourth object of the present disclosure is to provide an air machine.

In order to achieve the above objects, in a first aspect, the present disclosure provides an air-conditioning device control method, including the following steps: an air-conditioning device receiving an instruction sent by a terminal device; judging whether the instruction comes from a preset local area network; identifying a user identity according to the instruction, if the instruction comes from the local area network; and acquiring an operation mode, adapted to the user identity, of the air-conditioning device and executing the operation mode of the air-conditioning device.

The air-conditioning device control method according to embodiments of the present disclosure can push an operation mode that suits a user's own habit to the user without the user performing setting. As a result, it is unnecessary for a user to reset each time, thus reducing operations; at the same time the air-conditioning device can provide better service to the user, thus effectively improving user experience of the air-conditioning device.

In some examples, executing the operation mode of the air-conditioning device includes: initiating an inquiry to the terminal device; determining whether to switch the air-conditioning device to the operation mode according to a response from the terminal device; and if yes, switching to the operation mode to operate; alternatively, directly switching to the operation mode to operate.

In some examples, judging whether the instruction comes from a preset local area network includes: extracting network identification information from the instruction, wherein the instruction includes the network identification information; and judging whether the instruction comes from the local area network according to the network identification information.

In some examples, identifying a user identity according to the instruction includes: acquiring local area network IP information of the instruction and/or login ID information of the instruction; and identifying the user identity according to the local area network IP information and/or the login ID information of the instruction.

In some examples, acquiring an operation mode, adapted to the user identity, of the air-conditioning device includes: taking an operation mode set in the last use of the air-conditioning device by a user as the operation mode adapted to the user identity; or acquiring historical data of an operation parameter set during use of the air-conditioning device by a user; and determining the operation mode adapted to the user identity according to the historical data.

In a second aspect, the present disclosure provides an air-conditioning device, including: a detecting module, configured to receive an instruction sent by a terminal device and judge whether the instruction comes from a preset local area network; an identifying module, configured to identify a user identity according to the instruction after the detecting module judges that the instruction comes from the local area network; and a controlling module, configured to acquire an operation mode, adapted to the user identity, of the air-conditioning device and execute the operation mode of the air-conditioning device.

The air-conditioning device according to embodiments of the present disclosure can push an operation mode that suits a user's own habit to the user without the user performing setting. As a result, it is unnecessary for a user to reset each time, thus reducing operations; and at the same time, the air-conditioning device can provide better service to the user, thus effectively improving user experience of the air-conditioning device.

In some examples, the controlling module is configured to initiate an inquiry to the terminal device; determine whether to switch the air-conditioning device to the operation mode according to a response from the terminal device; and if yes, switch to the operation mode to operate; alternatively, directly switch to the operation mode to operate.

In some examples, the detecting module is configured to extract network identification information from the instruction; and judge whether the instruction comes from the local area network according to the network identification information, wherein the instruction includes the network identification information.

In some examples, the identifying module is configured to acquire local area network IP information of the instruction and/or login ID information of the instruction; and identify the user identity according to the local area network IP information and/or the login ID information of the instruction.

In some embodiments, the controlling module is configured to take an operation mode set in the last use of the air-conditioning device by a user as the operation mode adapted to the user identity; or acquire historical data of an operation parameter set during use of the air-conditioning device by a user; and determine the operation mode adapted to the user identity according to the historical data.

In a third aspect, the present disclosure provides a computer readable storage medium having stored therein an air-conditioning device control program, when executed by a processor, achieving the method in embodiments of the first aspect described above.

In a fourth aspect, the present disclosure provides an air machine, including: a memory; a processor; and an air-conditioning device control program stored in the memory and executable by the processor, wherein the processor, when executing the air-conditioning device control program, achieves the method in embodiments of the first aspect described above. Such an air machine can push an operation mode that suits the user's own habit to the user with reduced operations for settings. As a result, it is unnecessary for a user to reset each time, thus reducing operations; and at the same time, the air machine can provide better service to the user, thus effectively improving user experience of the air machine.

Additional aspects and advantages of the present disclosure will be partially given in the following description, and some will become obvious from the following description, or be understood through the practice of this application.

BRIEF DESCRIPTION OF THE DRAWINGS

The above and/or additional aspects and advantages of the present disclosure will become obvious and easy to understand from the description of the embodiments in conjunction with the following drawings, in which.

Figure 1:
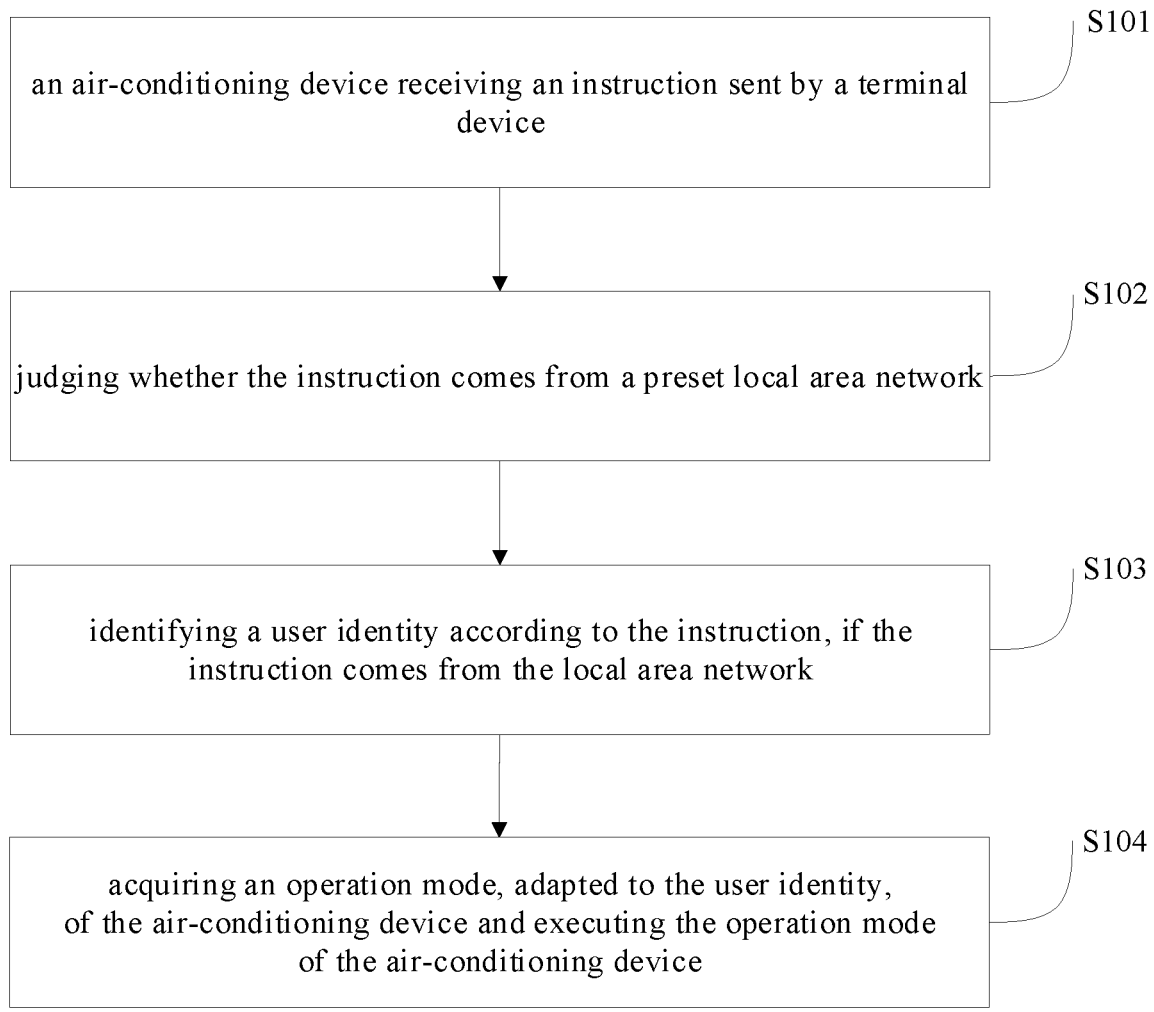
FIG. 1 is a flow chart of an air-conditioning device control method according to an embodiment of the present disclosure.

DESCRIPTION OF REFERENCE NUMERALS air-conditioning device 200; detecting module 210; identifying module 220; controlling module 230.

DETAILED DESCRIPTION OF THE EMBODIMENTS

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The air-conditioning device control method and the air-conditioning device according to embodiments of the present disclosure are described below in conjunction with drawings.

First, it should be noted that an air-conditioning device may communicate with a terminal device (such as a mobile terminal) via a home Internet of Things system. That is, the air-conditioning device may communicate with a terminal device (such as a mobile terminal) via International of Things. For example, the air-conditioning device is provided with a network communication module capable of communicating with Internet, herein referred to as a network connecting apparatus, through which it is possible to achieve an Internet of Things function for the air-conditioning device, in other words, it is possible to achieve control of the air-conditioning device via a mobile terminal.

In the above description, the terminal device is but not limited to a mobile terminal (such as a smartphone), a tablet computer, and a personal computer, etc. The air-conditioning device is but not limited to an air machine. The air-conditioning device (such as an air machine) refers to electronic equipment that integrates functions of a humidifier, a purifier and an air conditioner and focuses on controlling indoor air humidity, cleanliness and temperature.

FIG. 1 is a flow chart of an air-conditioning device control method according to embodiments of the present disclosure. As shown in FIG. 1, the air-conditioning device control method in an embodiment of the present disclosure includes the following steps S101-S104.

At S101: an air-conditioning device receives an instruction sent by a terminal device.

At S102: it is judged whether the instruction comes from a preset local area network.

For example, an instruction (such as a power-on instruction) sent by a terminal device is received, then network identification information is extracted from the instruction, and it is judged whether the network identification information comes from a local area network, wherein the instruction includes network identification information.

A user's mobile phone is taken as an example for the terminal device. For example, once returning home where the mobile phone accesses the local area network, the user sends a power-on instruction to the air-conditioning device via the mobile phone. After powered on, the air-conditioning device analyzes the power-on instruction as it carries network identification information. It should note that instructions sent through different networks usually carry respective identifiers that can distinguish which network they come from. Therefore, once powered on, the air-conditioning device may determine according to such an identifier whether the user arrives at home through the power-on instruction sent by the home network (i.e., an in-home local area network). If the power-on instruction comes from the home network, it indicates that the user is already at his/her own home.

In the above description, the purpose of judging whether the instruction comes from the preset local area network (e.g., a home network) is to determine that the user is already at home where he/she is about to enjoy or is enjoying a service brought by the air-conditioning device.

At S103, if the instruction comes from the local area network, a user identity is identified according to the instruction, that is if the terminal device accesses the preset local area network (i.e., accesses a home network), the user identity is identified according to the instruction sent by the terminal device.

Specifically, when it is determined that the user is at home, the user sends an instruction (such as a power-on instruction) to the air-conditioning device via for example a mobile phone, and the air-conditioning device identifies the user identify according to the instruction.

In a specific example, it may acquire local area network IP information of the instruction and/or login ID information of the instruction; and identify the user identity according to the local area network IP information and/or the login ID information of the instruction.

In this example, with communication via the local area network, the instruction carries an IP address of a sender (i.e., the terminal device), for example, 192.168.1.123, that is the local area network IP information. In general, when accessing the home network first time, the terminal device will be automatically assigned with a corresponding local area network IP address. In the case of a plurality of terminal devices, separate local area network IP addresses may be assigned for the plurality of terminal devices, respectively. Besides, when accessing the local area network next time, the terminal device will be automatically assigned with the IP address same as the previous access.

For example, terminal device A is automatically assigned with an IP address 192.168.1.123 in this access. In general, terminal device A will be still assigned with the same IP address 192.168.1.123 in the next access, if such an IP address is not occupied.

As such, it is possible to identify the user identity according to the IP address, i.e., a terminal device corresponding to the same IP address in the last access is the same one.

Of course, the IP address assigned each time may change. Thus, in embodiments of the present disclosure, it may alternatively identify the user identity according to the login ID information. For example, before controlling an air-conditioning device through a mobile phone, a user needs to establish his/her own account first and login a client program of the air-conditioning device through the account, such that the air-conditioning device can be controlled through the mobile phone. Therefore, the instruction carries account information, that is, login of the ID information, so that the user's identity can be identified.

At S104: an operation mode adapted to the user identity is acquired and executed.

Specifically, the operation mode set in the last use of the air-conditioning device by a user may be taken as the operation mode adapted to the user identity; or historical data of an operation parameter set during use of the air-conditioning device by a user is acquired; and the operation mode adapted to the user identity is determined according to the historical data.

For example, user A sets a corresponding operation mode in the last use of the air-conditioning device and a corresponding operation parameter under such a mode. In the current use of the air-conditioning device by user A, after identifying it is the same user (i.e., identify it is still user A), the air-conditioning device considers that the operation mode and the corresponding operation parameter set in the last use are suitable for user A. Thus, it may take the operation mode and the corresponding operation parameter set in the last use by user A as the operation mode adapted to user A.

Of course, it may alternatively acquire the historical data of an operation parameter set during use of the air-conditioning device by a user, and determine the operation mode adapted to the user identity according to the historical data. That is to say, it may collect the operation parameter set in previous multiple uses of the air-conditioning device by user A, and make a comprehensive analysis on the operation parameter set in previous multiple uses of the air-conditioning device by user A, thereby determining the operation mode relatively adapted to user A.

In a specific example, the operation mode of the air-conditioning device may be executed in different manners, for example, the operation mode is executed after user's permission is obtained; alternatively, the user may preset the air-conditioning device to execute the operation mode automatically once a matching operation mode is acquired.

For example, it may initiate an inquiry to the terminal device; determine whether to switch the air-conditioning device to the operation mode according to a response from the terminal device; if yes, switch to the operation mode to operate. Alternatively, it may directly switch to the operation mode to operate.

That is a message regarding whether to switch the air-conditioning device to the operation mode is sent to the terminal device; and the air-conditioning device is switched to the operation mode after user's confirmation is received. Alternatively, it may directly switch to the operation mode after the operation mode adapted to the user identity is acquired. As a result, it may push an operation mode that suits the user's own habit to the user, so that it is unnecessary for a user to reset each time, thus reducing operations; and at the same time, the air-conditioning device can provide better service to the user, thus effectively improving user experience of the air-conditioning device.

The air-conditioning device control method according to embodiments of the present disclosure can push an operation mode that suits a user's own habit to the user without the user performing setting. As a result, it is unnecessary for a user to reset each time, thus reducing operations; at the same time, the air-conditioning device can provide better service to the user, thus effectively improving user experience of the air-conditioning device.

Figure 2:
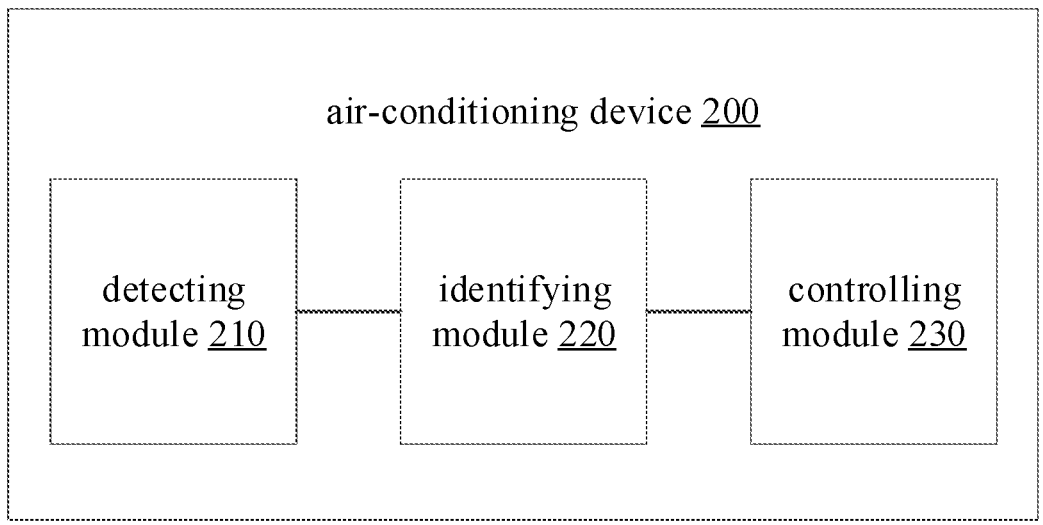
FIG. 2 is a structural block diagram of an air-conditioning device according to an embodiment of the present disclosure.

FIG. 2 is a structural block diagram of an air-conditioning device in an embodiment of the present disclosure. As shown in FIG. 2, according to an embodiment of the present disclosure, the air-conditioning device 200 includes a detecting module 210, an identifying module 220 and a controlling module 230.

The detecting module 210 is configured to receive an instruction sent by a terminal device and judge whether the instruction comes from a preset local area network. The identifying module 220 is configured to identify a user identity according to the instruction after the detecting module judges that the instruction comes from the local area network. The controlling module 230 is configured to acquire an operation mode, adapted to the user identity, of the air-conditioning device and execute the operation mode of the air-conditioning device.

In an embodiment of the present disclosure, the controlling module 230 is configured to initiate an inquiry to the terminal device; determine whether to switch the air-conditioning device to the operation mode according to a response from the terminal device; if yes, switch to the operation mode to operate; alternatively, directly switch to the operation mode to operate.

In an embodiment of the present disclosure, the detecting module 210 is configured to extract network identification information from the instruction; and judge whether the instruction comes from the local area network according to the network identification information, wherein the instruction includes the network identification information.

In an embodiment of the present disclosure, the identifying module 220 is configured to acquire local area network IP information of the instruction and/or login ID information of the instruction; and identify the user identity according to the local area network IP information and/or the login ID information of the instruction.

In an embodiment of the present disclosure, the controlling module 230 is configured to take an operation mode set in the last use of the air-conditioning device by a user as the operation mode adapted to the user identity; alternatively, the controlling module 230 is configured to acquire historical data of an operation parameter set during use of the air-conditioning device by a user; and determine the operation mode adapted to the user identity according to the historical data.

In an embodiment of the present disclosure, the controlling module 230 is configured to send a message regarding whether to switch the air-conditioning device to the operation mode to the terminal device; and switch the air-conditioning device to the operation mode after user's confirmation is received. Alternatively, it may directly switch to the operation mode after the operation mode adapted to the user identity is acquired.

The air-conditioning device according to embodiments of the present disclosure can push an operation mode that suits a user's own habit to the user without the user performing setting. As a result, it is unnecessary for a user to reset each time, thus reducing operations; and at the same time, the air-conditioning device can provide better service to the user, thus effectively improving user experience of the air-conditioning device.

It should be noted that the specific implementation manner of the air-conditioning device in embodiments of the present disclosure is similar to that of the air-conditioning device control method in embodiments of the present disclosure. Specific details may refer to description for the method, which are not elaborated here for concise.

Further, embodiments of the present disclosure provide a computer readable storage medium having stored therein a computer program, wherein the computer readable storage medium has stored therein an air-conditioning device control program, when executed by a processor, achieving an air-conditioning device control method as described above.

Further, embodiments of the present disclosure provide an air machine, including: a memory; a processor; and an air-conditioning device control program stored in the memory and executable by the processor, wherein the processor, when executing the air-conditioning device control program, achieves an air-conditioning device control method as described above. Such an air machine can push an operation mode that suits the user's own habit to the user with reduced operations. As a result, it is unnecessary for a user to reset each time, thus reducing operations; and at the same time, the air machine can provide better service to the user, thus effectively improving user experience of the air machine.

In addition, other structures and functions of the air machine according to embodiments of the present disclosure are known to those of ordinary skill in the art, which are not elaborated here to reduce redundancy.

It should be noted that, in the description of the current specification, Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

Reference throughout this specification to "an embodiment," "some embodiments," "one embodiment," "another example," "an example," "a specific example" or "some examples" means that a particular feature, structure, material, or characteristic described in connection with the embodiment or example is included in at least one embodiment or example of the present disclosure. Thus, the appearances of the phrases such as "in some embodiments," "in one embodiment," "in an embodiment," "in another example," "in an example," "in a specific example" or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. An air-conditioning device control method comprising:
receiving, at an air-conditioning device, an instruction sent by a user through a terminal device;
judging whether the instruction comes from a preset local area network;
in response to determining that the instruction comes from the preset local area network, determining that the user is at a location corresponding to the preset local area network;
in response to determining that the user is at the location corresponding to the preset local area network, identifying a user identity according to local area network IP information and login ID information of the instruction;
acquiring an operation mode of the air-conditioning device based on the instruction that is adapted to the user identity; and
executing the operation mode of the air-conditioning device, including:
initiating and sending an inquiry to the terminal device, the inquiry including a message regarding whether to switch the air-conditioning device to the operation mode;
determining whether to switch the air-conditioning device to the operation mode according to a response from the terminal device; and
in response to determining to switch, switching to the operation mode to operate.

2. The air-conditioning device control method according to claim 1, wherein judging whether the instruction comes from the preset local area network includes:
extracting network identification information from the instruction; and
judging whether the instruction comes from the preset local area network according to the network identification information.

3. The air-conditioning device control method according to claim 1, wherein identifying the user identity according to the instruction further includes:
acquiring the local area network IP information of the instruction and the login ID information of the instruction.

4. The air-conditioning device control method according to claim 1, wherein acquiring the operation mode adapted to the user identity includes taking an operation mode set by a user in a last use of the air-conditioning device as the operation mode adapted to the user identity.

5. The air-conditioning device control method according to claim 1, wherein acquiring the operation mode adapted to the user identity includes:
acquiring historical data of an operation parameter set by the user during use of the air-conditioning device; and
determining the operation mode adapted to the user identity according to the historical data.

6. A non-transitory computer readable storage medium having stored therein a computer program that, when executed by a processor, causes the processor to perform the air-conditioning device control method according to claim 1.

7. The air-conditioning device control method according to claim 1,
wherein the instruction is a power-on instruction;
the method further comprising:
in response to determining that the user is at the location corresponding to the preset local area network, controlling the air-conditioning device to be powered on.

8. An air-conditioning device comprising:
a memory storing a computer program; and
a processor configured to execute the computer program to:
receive an instruction sent by a user through a terminal device;
judge whether the instruction comes from a preset local area network;
in response to determining that the instruction comes from the preset local area network, determine that the user is at a location corresponding to the preset local area network;
in response to determining that the user is at the location corresponding to the preset local area network, identify a user identity according to local area network IP information and login ID information of the instruction;
acquire an operation mode of the air-conditioning device based on the instruction that is adapted to the user identity; and
execute the operation mode of the air-conditioning device, including:
initiating and sending an inquiry to the terminal device, the inquiry including a message regarding whether to switch the air-conditioning device to the operation mode;
determining whether to switch the air-conditioning device to the operation mode according to a response from the terminal device; and
in response to determining to switch, switching to the operation mode to operate.

9. The air-conditioning device according to claim 8, wherein the processor is further configured to execute the program to:
extract network identification information from the instruction; and
judge whether the instruction comes from the preset local area network according to the network identification information.

10. The air-conditioning device according to claim 8, wherein the processor is further configured to execute the program to:
acquire the local area network IP information of the instruction and the login ID information of the instruction.

11. The air-conditioning device according to claim 8, wherein the processor is further configured to execute the program to take an operation mode set by a user in a last use of the air-conditioning device as the operation mode adapted to the user identity.

12. The air-conditioning device according to claim 8, wherein the processor is further configured to execute the program to:
  acquire historical data of an operation parameter set by the user during use of the air-conditioning device; and
  determine the operation mode adapted to the user identity according to the historical data.

13. An air-conditioning device control method comprising:
  receiving, at an air-conditioning device, an instruction sent by a user through a terminal device;
  judging whether the instruction comes from a preset local area network;
  in response to determining that the instruction comes from the preset local area network, determine that the user is at a location corresponding to the preset local area network;
  in response to determining that the user is at the location corresponding to the preset local area network, identifying a user identity according to local area network IP information and login ID information of the instruction;
  acquiring an operation mode of the air-conditioning device based on the instruction that is adapted to the user identity, including:
    taking an operation mode set by the user identified by the user identity in a last use of the air-conditioning device as the operation mode adapted to the user identity; and
  executing the operation mode of the air-conditioning device.

* * * * *